United States Patent Office 3,394,785
Patented July 30, 1968

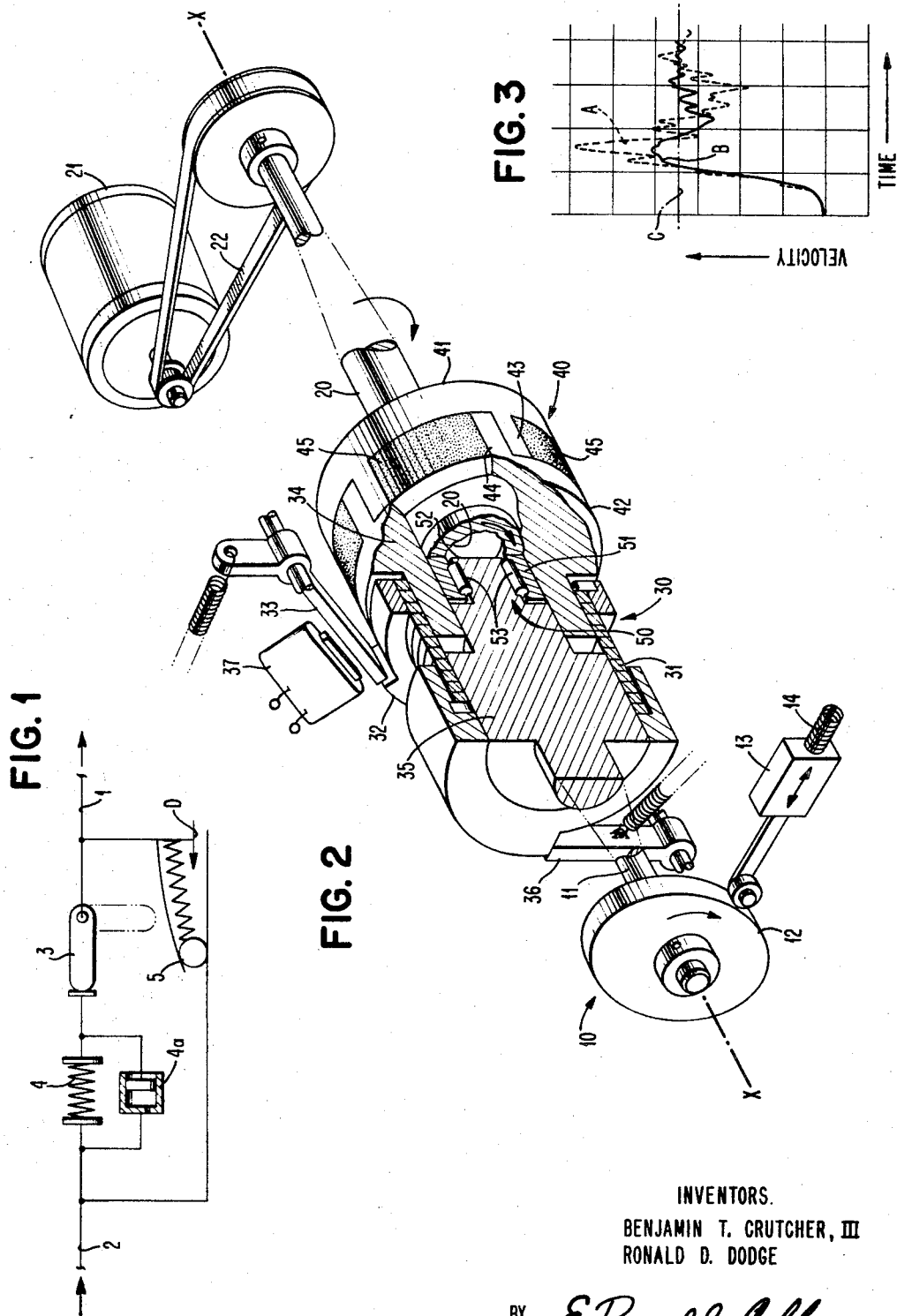

3,394,785
LATCH OPERATED ENERGY TRAP
POWER TRANSMISSION
Benjamin T. Crutcher III, and Ronald D. Dodge, Lexington, Ky., assignors to International Business Machines Corporation, Armonk, N.Y., a corporation of New York
Filed Apr. 26, 1966, Ser. No. 545,445
8 Claims. (Cl. 192—48.3)

ABSTRACT OF THE DISCLOSURE

Resilient torque couplings are conventionally employed to moderate the acceleration of driven systems operating through abruptly acting clutch devices. We provide a one-way clutch connected in parallel with such a resilient torque transmission to trap the energy it stores during acceleration. The trapped energy thus is prevented from causing overrun or excess speed of the driven system.

Disclosure of the invention

We have invented a compact power transmission capable of storing energy to moderate inertial forces normally induced by a positive or abruptly acting clutch; trapping the energy stored to prevent its return to the system that could cause an overrun; and effectively tying together the inertia of both driving and driven parts to provide maximum insensitivity to external energy transferred to the driven parts.

Cyclical machines, such as electromechanical typewriters, calculators, and telegraph transmitters, commonly employ positive or abruptly acting cluches, e.g., spring clutches, dog clutches, jaw clutches, etc., for connecting a load shaft to a power shaft usually for a single revolution or less. By definition, a positive or abruptly acting clutch causes high acceleration and thus induces high attendant forces in all parts accelerated.

It is known that such high accelerations can be moderated by permitting some angular displacement or slippage in the system to increase the time over which the velocity changes occur, and thus reduce the effective acceleration rate. One particularly convenient form of slippage is provided by a resilient torque coupling which permits angular displacement in direct proportion to the acceleration forces generated, and thus to some extent is self-compensating.

A resilient coupling, directly in series with the load shaft, inherently tends to store energy during acceleration and conversely to release the stored energy back into the system as the acceleration or inertial loads abate. It has been found that even when no resilient torque coupling is provided, returnable energy is stored in the deflection of supporting parts, drive belts, and other less-than-rigid components of the system. The structural deflection is not, however, an effective means of acceleration control due to its lack of predictability. Furthermore, the energy stored in structural deflection is distributed in many components which may be loaded and unloaded at varied times during the machine cycle, thus inducing many varied velocity control problems.

Whenever stored energy is released into a system, as by unloading a torque coupling or by moving a spring loaded cam to low dwell, there is a tendency for the system to accelerate causing a surge or increase in velocity well above the desired constant design velocity. This tendency is resisted only by the system inertia. Common spring clutches, and some dog clutches, provide effective shaft connection only in one direction of relative rotation. The mechanism driven through such a clutch is thus effectively severed from the inertia of the driving mechanism, i.e., electric motor. U.S. Patent 3,212,610 entitled, "Dual Pawl Dog Clutch," issued Oct. 19, 1965, to G. A. Walker and R. E. Hosey, discloses a clutch having an additional dog or pawl to tie the inertia of the downstream portion of a system with the motor and thereby minimize overrun due to external energy fed from sources such as cam follower springs, etc. Although a resilient torque coupling is also provided in the disclosed system to moderate acceleration loads, energy stored in the coupling is returnable directly to the system as acceleration loads abate, regardless of the additional pawl. Also, the effectiveness of the additional pawl is limited by backlash between the operative parts.

U.S. Patent No. 3,353,418 entitled, "Acceleration and Velocity Surge Control Mechanism," issued Nov. 21, 1967, to S. A. Okcuoglu, discloses and claims a mechanical transmission including a resilient torque coupling and an artificial load cam downstream thereof to maintain a torque loading on the coupling during all cycle times during which it is not desired to feed energy into the system. The present invention is an alternative approach to the problem described in U.S. Patent No. 3,353,418.

Accordingly, it has been an object of our invention to provide a compact, low inertia transmission for controlling acceleration loading and velocity surge in a positively clutched system.

A more specific object of our invention has been to provide a simply constructed power transmission for moderating the acceleration load induced by a positive acting clutch without introducing velocity surge due to energy stored in component parts.

A further object of our invention has been to provide a non-overrunning transmission with less backlash limitations than heretofore available.

Our invention is principled upon a mechanical connection that places a one-way drive member in parallel with both the positive acting clutch and the resilient coupling, whereby energy stored in the resilient coupling during acceleration, is trapped until the clutch is deactuated, and thus cannot be fed into the system. The one-way drive member is constantly urged to its drive condition by the resilient coupling so as to present a minimum of backlash to the drive system.

These and other objects, features, and advantages will be more apparent to those skilled in the art upon reading and understanding the following description of a preferred embodiment of our invention wherein reference is made to the accompanying drawings, of which:

FIGURE 1 is an explanatory view of our invention showing a linear motion analogy thereof;

FIGURE 2 is a perspective view of a typical cyclically operating machine including an energy trap transmission in accordance with a preferred embodiment of our invention; and FIGURE 3 shows comparative velocity traces illustrating beneficial effect of our invention.

FIGURE 1 shows the operative structural arrangement of our invention, as conceptually developed from rotative motion to linear motion for ease of understanding. The object of the illustrative mechanism is for the output 1 to be driven to the right by the input 2 upon engagement of the clutch element 3. A resilient force transmitting coupling 4, preferably dampened as by dash pot 4a, is coupled in series with the clutch 3 for acceleration control. A one-way driving connection 5 is provided in parallel with both the clutch 3 and the resilient coupling 4 as an energy trap. When the clutch 3 is moved to its clutching or full line position, the motion will be transmitted through the mechanism to output 1. Upon engagement of clutch 3, acceleration of the output 1 causes an inertial loading on resilient coupling 4, compressing it, and thus moderating the output acceleration rate. The one-way drive connection 5 permits this compression by allowing movement of output 1 in the direction of arrow D relative to the input 2.

After the period of acceleration has abated, the inertial loads on coupling 4 will no longer exist and energy stored therein during compression tends to expand the coupling and drive the output 1 faster than the input 2. Any such expansion is, however, prevented by one-way drive connection which prevents any relative movement between th input 2 and output 1 in the direction opposite to arrow D. The energy stored in resilient coupling 4 is thus trapped by the one-way drive connection 5. The resilient coupling 4 tends to hold the one-way drive connection in its drive condition (the ball against the cam) to minimize internal backlash and maintain an immediately effective connection between the input and output. Any tendency for the output to accelerate will be resisted by the inertia of the input.

When the clutch 3 is released, by movement to the broken line position, the energy stored in coupling 4 will be released by movement of the clutching element to the right, permitting the resilient coupling 4 to expand to its original condition in readiness for another operation. The damping means 4a limits the rate of expansion of resilient coupling 4 to avoid clash between parts.

FIGURE 2 shows a preferred embodiment of our coupling or transmission as applied to a typical machine or mechanism 10 having a rotatable driven load member or output shaft 11 that operates some form of load, such as a cam 12, to reciprocate a driven part 13 in opposition to a spring 14. The shaft 11 is intermittently abruptly connected to, and idsconnected from, a continuously rotating power drive member or input shaft 20 by a selectively engageable positive acting spring clutch 30, through an acceleration controlling, resilient torque coupling 40. Shafts 11 and 20 are also connected through an energy trapping overrunning clutch 50 in parallel with clutch 30 and resilient coupling 40. Clutch 30, resilient coupling 40 and overrunning clutch 50 are all compactly assembled concentrically about an axis X—X. The input shaft 20 is continuously driven by a motor 21 through a timing belt 22. The basic function of our transmission can be accomplished with the torque coupling 40 either upstream or downstream of the clutch 30. However, we have discovered that it is particularly useful to arrange these components as shown, such that a positive structural relationship exists between the clutch 30 which is externally controlled, and the output shaft 11. This arrangement provides, in particular, a more positive cycle end point.

The clutch 30 is shown as a conventional spring clutch. The clutch 30 includes a wrap spring 31 and a double lobe or half revolution control sleeve 32 connected to one end thereof. The sleeve 32 is normally engaged by a spring-loaded latch 33 to maintain the wrap spring 31 out of gripping engagement with an input arbor or operating part 34 that is attached to an output jaw 42 of the resilient coupling 40. The opposite end of the wrap spring 31 is connected to and continuously engaged with an output arbor or operating part 35 and thereby to the output shaft 11. When latch 33 releases the control sleeve 32, wrap spring 31 tightens on the arbor 34 and provides a driving connection between it and the arbor 35 to drive output shaft 11. A follow-up latch 36 is provided in a conventional manner to secure the output shaft 11 in its home position.

The resilient torque coupling 40 comprises a first jaw or operating part 41 that is attached to the input shaft 20, and the output or second jaw, or operating part 42 that is drivingly connected to clutch input arbor 34. The jaws 41 and 42 have respective teeth 43 and 44 thereon for transmitting and receiving torque through resilient energy storing means such as elastomeric inserts 45. Compression of the inserts 45 by the torque transmitted therethrough provides a proportional degree of force moderating slippage or angular displacement between jaws 41 and 42 during the periods of high acceleration. The amount of displacement is a function of the acceleration induced load, considering the clutch pickup time and the load inducing characteristics of the machine 10, together with the spring rate or resiliency of the elastomeric insert 45. Load shaft 11 and components downstream thereof feel only the moderated acceleration rate and thus are protected from clutching shock. A similar torque coupling is disclosed in the aforementioned U.S. Patent 3,212,610.

The overrunning or one-way clutch, coupling, or drive connection 50 is provided by an annular collar or sleeve member 51 that is attached to input shaft 20 and surrounds an internal projecting portion or shaft member 52 of the clutch output arbor 35. Cylindrical rollers 53 ride in appropriate camways of the collar 51 and connect the projection 52 thereto to permit rotation therebetween in one relative direction while tightly locking the members 51 and 52 together to prevent rotation in the opposite relative dirction. More specifically, the input shaft 20 and its collar 51 are permitted to turn faster than or overrun the output shaft 11 and the projecting portion 52, but the output shaft 11 is not permitted to turn faster than or overrun the input shaft 20. The overrunning clutch 50 is of well-known construction and is in principle like that illustrated in U. S. Patent 1,834,082 issued to M. H. Ballard et al.

The operation of the mechanism of FIGURE 2 is readily understood from the previous description of FIGURE 1. When reciprocation of the driven part 13 is desired, latch 33 is picked, as by an appropriate electromagnet 37, thus releasing the sleeve 32 and allowing wrap spring 31 to engage the constantly rotating input arbor 34. Prior to this engagement no motion was transmitted through the overrunning clutch 50 since this clutch freely allows the input shaft 20 to rotate counterclockwise relative to output shaft 11. The output cam 12, and other associated mechanisms, accelerate as the wrap spring 31 comes into engagement. The resultant inertial load is felt in the form of torque or compression force on the elastomeric inserts 45 between the coupling teeth 43 and 44. The elastomeric inserts 45 deflect under the load permitting displacement or slippage between the teeth 43 and 44. The acceleration rate and the attendant inertial loads imposed upon the output shaft 11 and mechanisms connected thereto are thus moderated.

After the period of peak acceleration has passed, the inertial loads abate and the resilient inserts 45 tend to expand and drive the teeth 44 clockwise relative to the teeth 43. Such motion is prevented, however, by the overrunning clutch 50, except to the extent permitted by clutch backlash. Once clutch backlash has been taken up, the speed of the output shaft 11 is inertially limited by the speed of the input shaft 20. This inertial limitation is important in a mechanism like that shown having a spring 14 that tends to drive the output shaft 11 after the cam 12 has passed its high point independently of the input shaft 20. As in the illustration of FIGURE 1, the energy stored in the compressed elastomeric inserts 45 is trapped until the clutch output arbor 35 is declutched from the input arbor, thus permitting elastomeric inserts 45 to expand by allowing the teeth 43 to rotate counterclockwise relative to the teeth 44. The elastomeric inserts 45 inherently provide a degree of damping to limit the speed of restoration.

The velocity traces of FIGURE 3 compare the velocity response of a system having a resilient torque coupling for acceleration moderation (trace A), with a substantially identical system provided with our energy trap configuration (trace B). Note the greatly tempered overshoot and oscillation of trace B relative to trace A and the nominal velocity C. Investigation has shown that much of the variation in trace B is due to input variations.

Those skilled in the art will appreciate that we have provided a simple acceleration control mechanism that employs a novel trap construction to prevent the undesired release of stored energy into the system. It will be understood that various modifications, additions, and deletions can be made to the mechanism disclosed without departing from the spirit and scope of our invention. The particular form of clutching elements, resilient couplings, and one-way drive connections can be varied without detracting from the operation of the system. It is particularly important, however, that the one-way overrunning clutch 50 be of precision construction to minimize backlash at the end of the acceleration period since a very small amount of relative rotation can produce instantaneous velocity surges detrimental to the velocity pattern desired.

Having thus described our invention, its concepts and illustrative preferred embodiments thereof, we claim:

1. In a power transmission having a continuously rotating power member, a rotatable load member, and a selectively engageable clutch for abruptly connecting and disconnecting the power and load members, the acceleration control mechanism comprising:
   resilient energy storing means coupled in series power transmitting relationship with the power member, the clutch, and the load member for reducing acceleration shock on the load member, and
   a one-direction driving connection operably connected between the power member and the load member and in parallel power transmitting relationship with the clutch and said resilient energy storing means, said one-direction driving connection permitting overrunning movement of the power member relative to the load member, but preventing relative overrunning movement of the load member relative to the power member.

2. A power transmission as defined in claim 1 wherein said one direction driving connection comprises a roller type overunning clutch.

3. A power transmission as defined in claim 1 wherein said energy storing means is connected between the power member and the abruptly acting clutch.

4. A power transmission as defined in claim 1 wherein said energy storing means comprises at least one elastomeric member.

5. In a mechanism having a rotating power member, a rotatable load member, a selectively engageable clutch for connecting and disconnecting the power and load members, and means independent of the power member tending to drive the load member, the improved velocity control mechanism comprising:
   resilient energy storing means coupled in series power transmitting relationship with the power member, the clutch, and the load member, and
   a one-direction driving connection operably connected between the power member and the load member and in parallel power transmitting relationship with the clutch and said resilient energy storing means, said one-direction driving connection permitting overrunning movement of the power member relative to the load member, but preventing relative overrunning movement of the load member relative to the power member.

6. A mechanism as defined in claim 5 wherein said one direction driving connection comprises a roller type overrunning clutch.

7. In a power transmission for intermittently delivering rotative energy from a continuously rotating power shaft to a driven shaft comprising:
   first, second and third operating parts,
   a selectively operable abruptly acting clutch for selectively connecting said first operating part to said second operating part,
   a resilient torque coupling continuously connecting said second part to said third part,
   a one-direction torque connection directly connecting said first part with said third part,
   one of said first and third parts being operatively connected to said power shaft and the other of said first and third parts being operatively connected to said driven shaft.

8. In a power transmission for intermittently delivering rotative energy from a continuously rotating power shaft to a driven shaft comprising:
   first, second and third operating parts,
   a selectively operable abruptly acting clutch for selectively connecting said first operating part to said second operating part,
   a resilient torque coupling continuously connecting said second part to said third part,
   a one-direction torque connection directly connecting said first part with said third part,
   one of said first and third parts being operatively connected to said power shaft and the other of said first and third parts being operatively connected to said driven shaft when first, second and third parts are mounted for concentric relative movement relative to a common axis.

References Cited

UNITED STATES PATENTS

| 2,082,129 | 6/1937 | Van Ranst. | |
| 2,985,271 | 5/1961 | Wilson | 192—52 |
| 2,023,690 | 12/1935 | Lyman | 192—105 |

BENJAMIN W. WYCHE III, *Primary Examiner.*

L. J. PAYNE, *Assistant Examiner.*